May 24, 1966  R. W. LARSON ETAL  3,252,487
APPARATUS FOR DELIMBING AND FELLING TREES
Filed June 3, 1963  4 Sheets-Sheet 2

INVENTORS
ROBERT W. LARSON
OLE E. OLSON
BY WILFRID D. HARKNESS
WILLIAM E. MAIR

Meyers & Peterson
ATTORNEYS

United States Patent Office 3,252,487
Patented May 24, 1966

---

3,252,487
APPARATUS FOR DELIMBING AND FELLING TREES
Robert W. Larson, Ashland, Wis., and Ole E. Olson, Caramat, Ontario, and Wilfrid D. Harkness and William E. Mair, Marathon, Ontario, Canada, assignors to Marathon Corporation of Canada Limited, Marathon, Ontario, Canada, a corporation of Canada
Filed June 3, 1963, Ser. No. 285,114
44 Claims. (Cl. 144—3)

The instant patent application is a continuation-in-part of our previous application Serial No. 196,195, filed May 21, 1962, now abandoned.

This invention relates generally to logging equipment, and pertains more particularly to apparatus for delimbing and felling trees.

One object of the invention is to provide mobile apparatus for harvesting trees that can propel itself in the areas where the trees are to be cut and to process standing trees having the required specifications or characteristics.

Another object of the invention is to provide apparatus capable of stripping the limbs from trees to a selected height while the tree is still standing.

Another object is to permit the topping of the standing tree at the desired height.

The invention also has for an object the shearing of the tree at its bottom after the topping action has occurred.

Yet another object of the invention is to provide apparatus for handling the severed tree in a manner such that it can be immediately placed upon a pile of logs laying on the ground.

Still another object of the invention is to provide apparatus of the foregoing character that can be operated with a crew of only one man, if desired. Also, the invention has for an aim the provision of apparatus that is quite simple and that can be operated by a person having only limited skill. It is also within the contemplation of the invention to provide apparatus that can perform its required task quite swiftly and which apparatus is sufficiently rugged so that little maintenance is necessary.

These and other objects and advantages of this invention will more fully appear from the following description, made in connection with the accompanying drawings, wherein like reference characters refer to the same or similar parts throughout the several views and in which.

Figures 1, 8:
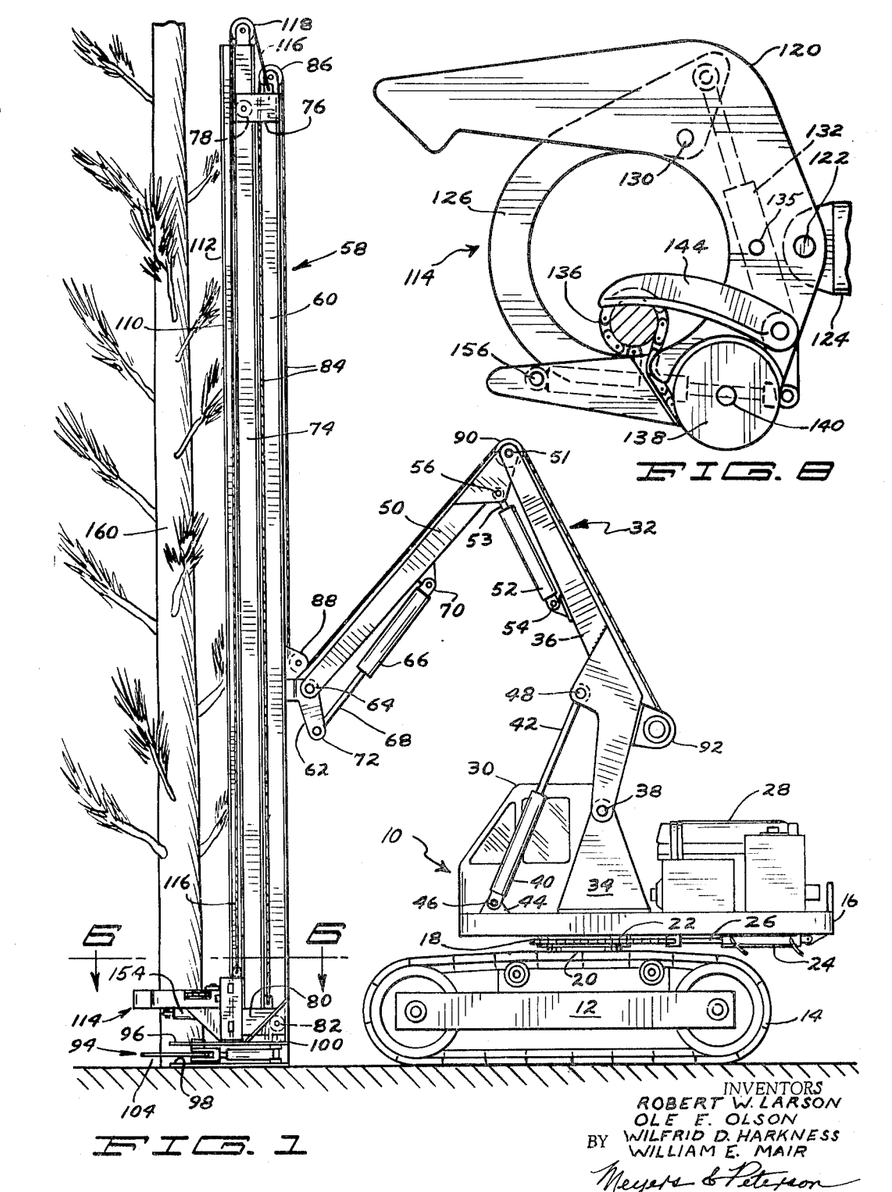
FIGURE 1 is a side elevational view of one form my apparatus may assume, the view showing the apparatus being moved into juxtaposition with a standing tree that is to be delimbed and cut.
FIGURE 8 is another view of the combined delimbing and shearing mechanism, this view being taken in the direction of line 8—8 of FIGURE 2 and illustrating the shearing member in a position just starting to perform a topping operation.
Figures 2, 4, 5:
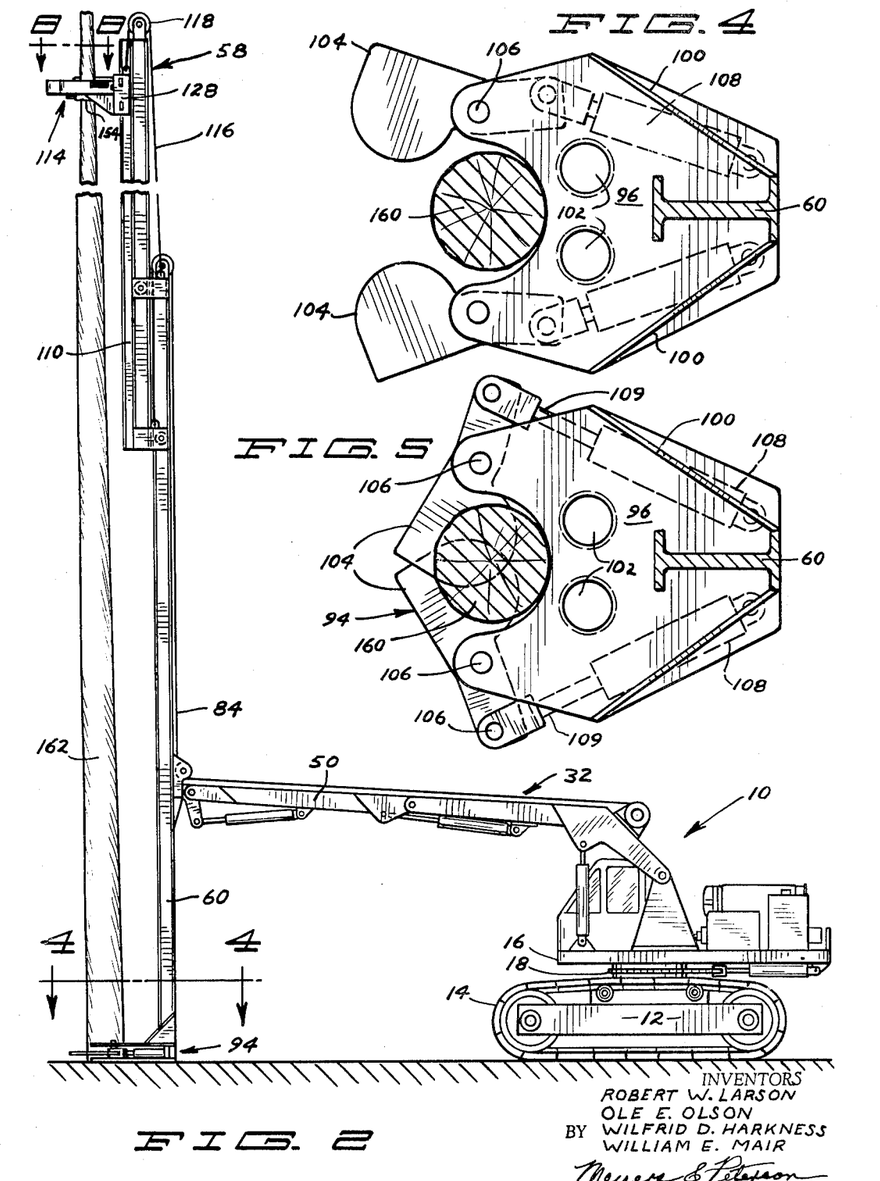
FIGURE 2 is a side elevational view with the vehicle spaced farther from the tree than in FIGURE 1, but the apparatus being depicted in a position at the termination of the delimbing action and just prior to a topping operation.
FIGURE 4 is a plan view of the bottom shear mechanism before a shearing operation is undertaken.
FIGURE 5 is a view similar to FIGURE 4 but showing a shearing operation in process.

Referring now in detail to the drawings, FIGURES 1 and 2 show a vehicle denoted generally by the reference numeral 10. While this vehicle can assume a variety of mechanical constructions, it is illustrated as having a chassis 12 equipped with endless tracks 14. Surmounting the chassis 12 is a swing platform 16 which is rotatable about a vertical axis by reason of a chain 18 in mesh with a main sprocket 22 affixed to a base plate 20 on the chassis 12. Thus, by means of the chain 18 in mesh with the sprocket and a pair of hydraulic cylinders 24 with extensible pistons 26, the platform 16 can be actuated into various angular positions. An engine 28 is carried on the platform and provides the propelling power for the vehicle as well as hydraulic power for the cylinders 24 and various hydraulic cylinders yet to be described. An operator's cab 30 is also located on the platform 16.

Indicated generally by the reference numeral 32 is an articulated or reach boom assembly labeled 32. The boom assembly 32 is mounted on the swing platform 16 through the medium of a pair of uprights or standards 34. The assembly 32 includes a first arm or rear boom section 36 connected to the standards 34 through the agency of a pivot pin or shaft 38. The rear boom section 36 can be raised and lowered by a hydraulic cylinder 40 having an extensible piston rod 42. The closed end of the cylinder 40 is connected to an anchor ear 44 fixedly secured to the platform 16, whereas the piston rod 42 is connected to the rear boom section 36 by a pin 48.

Continuing with the description of the articulated or reach boom assembly 32, it is to be observed that this assembly additionally includes a second arm or end boom 50 pivotally connected to the boom section 36 by a pin 51. A hydraulic cylinder 52 having an extensible piston rod 53 has its closed end pivotally connected to the rear boom section 36 by a pin 54. The piston rod 53, on the other hand, is pivotally connected to the end boom 50 by a pin 56.

Carried at the end of the boom 50 of the articulated or reach boom assembly 32 is a sliding boom assembly 58 comprised of a mast or vertical boom 60 having an I-beam configuration. A bell crank 62 has one end fixedly secured to the vertical boom 60 and is pivotally attached to the end boom 50 through the medium of a pin 64. For pivoting the boom 60 in a vertical plane determined by the angular position of the swing platform 16 is a hydraulic cylinder 66 having a reciprocable piston 68. The closed end of the cylinder 66 is connected to an intermediate portion of the end boom 50 by way of a pin 70 and the piston is connected in a pivotal manner to the bell crank 62 via a pin 72.

Included as part of the boom assembly 58 is a traveling vertical boom 74 which also has an I-shaped cross section, this boom having assigned thereto the reference numeral 74. At the upper end of the boom 60 is a bracket 76, the bracket being fixedly attached to the boom 60 and provided with guide wheels 78 which bear against the flange of the boom 74 lying adjacent the boom 60. A lower bracket 80 is affixed to the traveling boom 74 and it is similarly provided with guide wheels 82. It will be appreciated that the traveling boom 74 is constrained to follow a reciprocal path relative to the boom 60 owing to the action provided by the guide wheels 78 and 82, the guide wheels 82 engaging the flange of the boom 60 adjacent the boom 74. In order to raise and lower the boom 74 relative to the boom 60 a flexible cable 84 is connected at one end to the lower end of the traveling boom 74 and then extends upwardly between this boom and the boom 60. The cable 84 then passes about a sheave or pulley 86 mounted at the top of the boom 60 and thence downwardly beneath a sheave 88 mounted for rotation about a fixed axis provided by the boom 60. After passing beneath the sheave 88 the cable 84 extends along the end boom 50 of the boom assembly 32 and then passes over a sheave 90 at the pin 51. A drive means such as a hydraulic winch 92 on the rear boom section 36 serves as a means for taking up and paying out the cable 84 in order to elevate and lower, respectively, the traveling boom 74 with respect to the boom 60.

Figures 3, 6, 7:
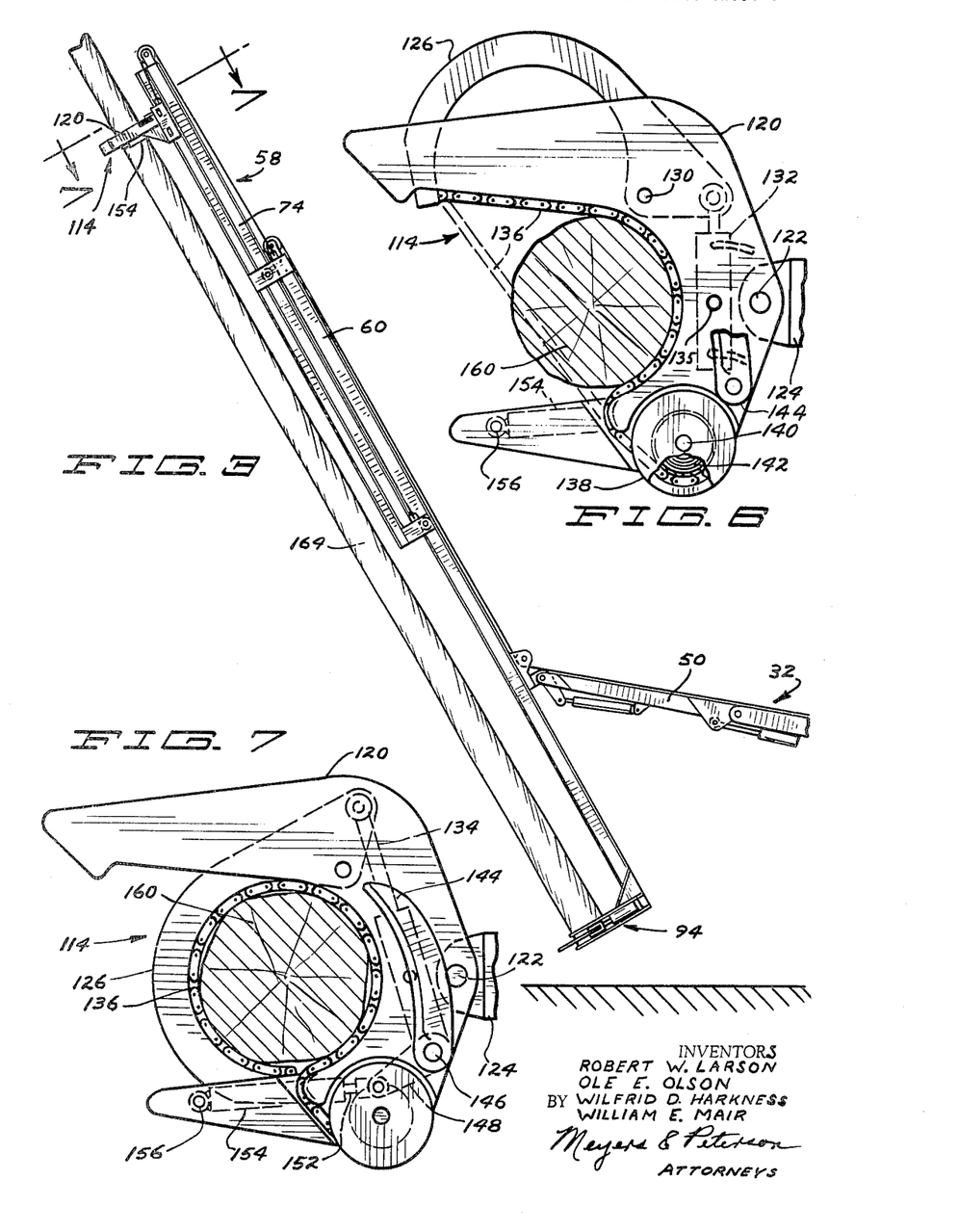
FIGURE 3 is a fragmentary side elevation of the vertical boom assembly while handling the now completely cut tree for the purpose of placing the severed tree on the ground.
FIGURE 6 is a plan view of the combination delimbing and top shear mechanism, the view being taken in the direction of line 6—6 of FIGURE 1.
FIGURE 7 is a view similar to FIGURE 6 but a mechanism ready for a delimbing operation.

Describing now the bottom shear mechanism which is designated generally by the reference numeral 94, it can be seen from FIGURES 1–3 that this mechanism includes an upper plate 96 and a lower plate 98. The upper plate 96 is made integral with the boom 60 of the sliding boom assembly 58 through the agency of gusset members 100. The two plates 96, 98 are made rigid with respect to each other by vertical connecting pins or studs 102, the upper ends of these studs being welded to the plate 96 and the lower ends to the plate 98. Between the plates 96, 98 are a pair of shear blades 104 that are pivotally mounted on a pair of pins 106. These blades are actuated toward each other in the performance of their cutting operation by two hydraulic cylinders 108, each being equipped with an extensible piston rod 109.

Welded or otherwise secured to the traveling boom 74 is a T-shaped guide rail providing a flange 112. The guide rail 110 functions as a track means for the combined delimbing and top shear mechanism identified in its entirety by the reference numeral 114. For the purpose of causing the mechanism 114 to move upwardly in the performance of the stripping or delimbing operation there is a cable 116 which is connected at one end to the mechanism 114 and passes over a sheave or pulley 118 carried at the top of the boom 74, the other end of the cable 116 may be attached to the bracket 76 which has already been referred to as being affixed to the boom 60. The delimbing and top shear mechanism 114 includes a U-shaped frame structure 120 which may be of a built-up welded plate construction. The U-shaped configuration of the frame 120 is shown to better advantage in FIGURES 6 and 7. As can also readily be seen from these figures, there is a pin 122 which pivotally mounts the frame 120 to a bracket 124 having a base 128 (best understood from FIGURE 2), the base 128 carrying rollers (not visible) which engage the flange 112 of the guide rail 110.

For the purpose of effecting the delimbing action an encircling arm 126 is pivotally connected to a locus within the frame structure 120 by a pivot pin 130. The arm 126 is actuated by a hydraulic cylinder 132 provided with an extensible rod 134. The cylinder 132 is pivotally supported by the frame 120 by pin means 135. When the piston rod 134 is retracted into the cylinder 132, the arm 126 assumes the position pictured in FIGURE 6, but when the rod 134 is urged outwardly, then the arm assumes the position shown in FIGURE 7.

The actual element that accomplishes the stripping of the limbs from the tree as the mechanism 114 moves upwardly is a shearing knife head such as a sharp-edged flexible chain 136 having one end thereof secured to the free end of the arm 126. The other end of the chain 136 is attached to a spool or drum 138 mounted for rotation about a vertical pin or post 140. The spool 138 is biased in a rotative direction, more specifically, a counterclockwise direction, by a flat spiral spring 142, a portion of the upper end of the spool 138 having been broken away in FIGURE 6 to show this spring. Stated somewhat differently, the chain 136 is caused to be wound on the spool 138 when there is no tree that would overcome the spring action provided by the spring 142. Thus, when the encircling arm 126 is in the position pictured in FIGURE 6 and there is no tree within the opening of the U-shaped frame 120, then the chain 138 will appear in the phantom position shown in this particular figure.

Continuing with the description of the delimbing and top shear mechanism 114 and considering now in detail the elements performing the shearing function, it is to be observed that a blade 144 is free to move across the top of the U-shaped frame structure 120, the blade being attached to a shaft 146 that extends downwardly through the frame 120. At the lower end of the shaft 146 is a lever arm 148. The lever arm 148 is connected by means of a pin 150 to a piston rod 152 projecting from a hydraulic cylinder 154. The closed end of the cylinder 154 is pivotally attached to a fixed internal portion of the frame structure 120 by the pin 156 so that when the rod 152 is projected outwardly the blade 144 is caused to move in a counterclockwise direction as viewed in FIGURE 8.

Having presented the foregoing information, the manner in which our apparatus operates should be readily comprehended. Assuming that a standing tree 160 with limbs thereon is to be delimbed and severed, the vehicle 10 is moved into the position in which it appears in FIGURE 1. The articulated or reach boom assembly 32 is shown with the booms 36 and 50 forming an acute angle. However, this angle can be increased or decreased depending upon the particular circumstances. At any rate, the vehicle 10 is moved into the appropriate position so as to cause both the bottom shear mechanism 94 and the combined delimbing and top shear mechanism 114 to encircle the standing tree 160, all as is obvious from an inspection of FIGURE 1.

As the mechanism 114 moves into an encircling or embracing relationship with the tree 160, the chain 136 will be forcibly deflected from its phantom outline position of FIGURE 6 into the partially encircling relationship shown in solid outline in this particular figure. The spool 138, due to the yieldability of its flat spiral spring 142, will permit this to happen. However, when the cylinder 132 receives fluid under pressure its piston rod 134 will be projected and such projection causes the arm 126 to encircle the tree 160 as appears in FIGURE 7. Since the chain 136 is connected at one end to the free end of the arm 126, the chain will be completely enwrapped about the tree 160, irrespective of its particular diameter because the spool 138 will take up any slack in the chain 136 that might otherwise exist.

The orientation of parts pictured in FIGURE 7 illustrates that the delimbing and top shear mechanism 114, which is now at the bottom of the sliding boom assembly 58, is in readiness for being pulled upwardly in the performance of the stripping or delimbing operation. This automatically transpires when the winch 92 takes up its cable 84. It will be recalled that one end of the cable 84 is connected directly to the lower end of the traveling boom 74.

As the traveling boom 74 is pulled upwardly by the winch 92, the sheave 118 at the top of this boom is, of course, moved upwardly too. It acts against the cable 116 which has one end attached to the mechanism 114 and the other end fixedly connected to the bracket 76. Hence, when the traveling boom 74 moves, the mechanism 114 is compelled to move upwardly also. The upward movement of the mechanism 114 is guided by the T-shaped rail 110. As will be observed in this structural relationship of the elements, since cable 116 is fixedly secured to bracket 76 on the vertical boom 60, the net result is that for each increment of upward movement by sheave 118, with traveling boom 74, a similar incremental movement is produced in the cable 116 over the sheave 118, with corresponding movement of the mechanism 114 up the traveling boom 74 with a resultant accumulated movement or multiplied speed of the mechanism 114 relative to the tree 160. As will be appreciated, the actual effective speed of the mechanism will be a multiple of the speed with which the operator employs to the winch 92 to take up its cable 84.

As the mechanism 114 moves upwardly, the close engagement of the chain 136 with the tree 160 strips all of the branches therefrom. The shearing knife head in accordance with the stated objectives herein moves quite swiftly and exerts an impact cleavage upon the tree branches. Even when the shearing knife head comprises a chain member 136 in which the edges are dull, a fairly thorough job of delimbing can be accomplished. The flat spiral spring 142, of course, permits the spool 138 to pay out or take in the chain 136 as need be. In this regard, it will be recognized that the tree 160 becomes progressively smaller as the movement continues toward the upper end or top thereof, but the spool 138 due to the spring 142 readily accommodates for this. To distinguish the standing tree 160, which is to be considered as having its limbs on it, from the delimbed tree, the delimbed tree has been denoted by the reference numeral 162 in FIGURE 2.

When the combined delimbing and top shear mechanism 114 reaches the desired height, which height is determined largely by the usable length of the tree, then the operator causes the cylinder 154 to receive fluid under pressure to the extent that the shaft 146, together with its top shear blade 144, is rotated in a counterclockwise direction. FIGURE 8 has been presented to show the initiation of this top shearing operation.

After the topping operation has been completed, then the bottom shear mechanism 94 is actuated through the medium of its hydraulic cylinder 108. The blades 104 of this mechanism 94 are moved from the position in which they are shown in FIGURE 4 to a position beyond which they are shown in FIGURE 5. This severs or cuts the lower end of the delimbed tree 162 from its rooted stump.

It will now be appreciated that the severed tree is the length of the tree between the blades 104 of the bottom shear mechanism 94 and the blade 144 of the combined delimbing and top shear mechanism 114. It will also be recognized that the chain 136 still encircles the upper end of the severed tree. At this time, the operator permits the traveling boom 74 to be lowered sufficiently so as to bring the mechanism 114 downwardly approximately one-third the length of the severed tree. The severed or cut tree has been designated by the reference numeral 134 in FIGURE 3. With the blades 104 still together, the operator can cause the boom assembly 32 to assume practically any optimum angular position that he desires. For the purpose of discussion, it will be assumed that the boom sections 36 and 50 are approximately in a straight line relationship with each other. If this is so, then the actuation of the hydraulic cylinder 66 can readily move the now cut or severed tree 164 into the angular relationship depicted in FIGURE 3. This is an intermediate orientation of the tree 164 preparatory to placing the tree on a pile of logs or other desired location on the ground. The swing platform 16 of the vehicle 10 can be swung into the appropriate angular position for placing the tree 164 where it is wanted. When in the angular position shown in FIGURE 3, the return of the arm 126 to its position of FIGURE 6 will release the severed tree 164 so that it readily falls from the sliding boom assembly 58.

An alternative procedure can be effected following the cleavage of the branches through the quickly ascending shearing knife head and after the topping operation has been completed. In such procedure, the blade 144 is withdrawn immediately after its actuation to top the tree. Since the shearing knife head lies beneath the topping blade 144, the cut upper end of the tree still remains captive. The cable 84 is then caused to play out at a rate just as quick as during its pulling cycle or even so fast that the tension exerted by the shearing knife head is virtually removed from the cable. The shearing head chain 136 will resiliently encircle the trunk of the tree and expand during its rapid descent. The broken or cut stubs of the branches which were cleaved during the ascent of the shearing knife head are now given a second impact during the descent thereof. These stubs including the upwardly angulated remainders of branches are easily removed by this second high speed treatment and the shearing knife head may then be raised to an intermediate position following which the tree is severed by the bottom shear and the cut tree piled as before described.

Although the hydraulic lines leading to the various cylinders have not been pictured, it can be appreciated that fluid under pressure is delivered from a suitable pump that can be driven from the engine 28. Appropriate valving can determine the extension and retraction of the various piston rods belonging to the various hydraulic cylinders in order to achieve the various maneuvers that are necessary in carrying out a given processing of a standing tree. Thus, a standing tree can be first delimbed, secondly, topped, thirdly, severed at its bottom, and fourthly, manipulated into a desired position for placement on a pile of other logs or the like.

Figures 9, 10, 11, 12, 13:
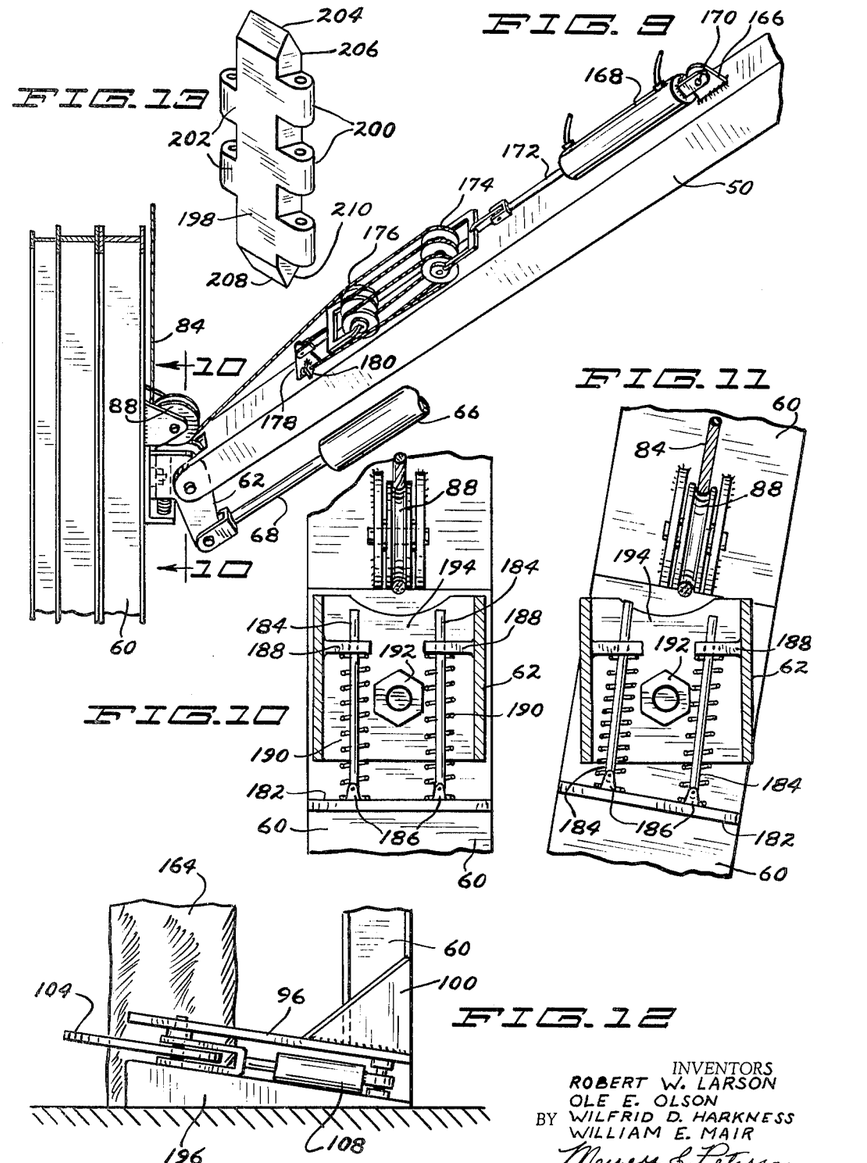
FIGURE 9 shows an alternate form of mechanism for effecting swift and exaggerated pulling of the flexible cable through means of a multiple sheave drive means.
FIGURE 10 is an enlarged vertical cross section of the bell crank mount of the vertical boom taken on the line 10—10 of FIGURE 9 and looking in the direction of the arrows.
FIGURE 11 is a view similar to FIGURE 10 showing the vertical boom resiliently displaced from its normal position.
FIGURE 12 shows an alternate form of the bottom shear mechanism for securing a positive seat for the base of a cut tree.
FIGURE 13 is an alternate form of chain link for the shearing knife head.

With reference to FIGURE 9, an alternate form of drive means is shown for effecting speed multiplication in the upward and downward travel of the flexible cable 84. In the form shown in FIGURE 9, the power winch 92 of FIGURE 1 is eliminated and the drive means is mounted directly upon the end boom 50. An anchoring bracket 166 is secured to the end boom 50 as shown and a hydraulic cylinder 168 is mounted pivotally thereto at 170. An extensible piston rod 172 projects from the cylinder 168 and is secured to a multiple sheave block 174 as shown. A second multiple sheave block 176 lies in confronting relation with respect to the block 174 and is anchored to a bracket 178 which in turn is fixed adjacent the outer end of the end boom 50. The flexible cable 84 extends to the multiple sheave block 174 and then is passed back and forth between the two multiple sheave blocks for several loops. The end of the flexible cable 84 is then anchored at 180 to the end boom 50.

It will be appreciated that a short travel of the piston rod 172 will greatly multiply the relative travel of the flexible cable 84. Such a drive mechanism can thus effect the swift rise and fall of the shearing knife head to augment the impact cleavage previously mentioned. It will be noted that constant pressure applied to the cylinder 168 will cause the flexible cable 84 to accelerate when pulling a top shearing mechanism from a position of rest. This effect is further augmented by the mass of the traveling boom 74 which also travels upwardly but at half the rate of speed of the top shear mechanism. The net effect is an effective multiplying force applied to the knife head and the tremendous momentum effects the impact cleavage of the branches with acceleration therefrom to the required effective force and without appreciably slowing the speed at which the top shear mechanism rises. Similarly, when the top shear mechanism is permitted to fall freely, the acceleration of gravity maintains its momentum for snapping and cleaving the butt ends of branches which may remain.

While the bottom shear mechanism 94 can rest upon the ground and be supported and stabilized thereby, the upper end of the boom assembly 58 is not so braced or supported. This can, however, be a desirable feature in that the mast or vertical boom can weave laterally to conform to curvature and irregularities in the trunk of a tree. In order not to transmit this strain to the boom assembly 32, we have shown a resilient swivel connection between the bell crank 62 and the mast or vertical boom 60 in FIGURES 10 and 11. A flange 182 is rigidly fixed to the rear of the mast 60 and upstanding rods 184 are swivelly mounted to the flange 182 at 186. The upper ends of the rods 184 extend through respective guide lugs 188 and compression springs 190 may be placed respectively upon the rods 184 and in abutting relation between the flange 182 and the lugs 188 as shown in FIGURE 10. A pivot bolt 192 passes through the back plate 194 of the bell crank 62 and is firmly anchored in the mast 60. The bell crank 62 can thus swivel about the axis of pivot 192 and permit limited relative swinging of the mast relative to the bell crank 62. FIGURE 11 shows an extreme movement of the mast 60 as may be caused by the delimbing of an irregular tree. The springs 190, however, will tend to bring the mast or vertical boom 60 back into the alignment shown in FIGURE 10 when lateral forces are removed from the mast.

While the views of FIGURE 4 and FIGURE 5 show the bracing effect of the plate 96 against the base of the tree 160, there may be a tendency for the tree to become unseated once the bottom shear has severed the trunk from the stump. In order to assist in preserving the bracing effect of the bottom shear, the entire bottom shear mechanism can be affixed to the mast or vertical boom 60 at a slight angle as shown in FIGURE 12. In the angulated arrangement, a wedge shape bottom plate 196 may be substituted for the flat bottom plate 98 shown in FIGURE 1. The remaining elements of the bottom shear mechanism, however, may remain the same. It will now be observed that the blades 104 will cut the tree 164 at an angle and the cut tree will remain resting upon the blades 104 after it is cut. At the same time, the slight angle will tend to advance the tree 164 against the plate 96 and maintain it in abutted relation therewith for subsequent handling. The firm support of the delimbed and cut tree constitutes a safety factor in the subsequent handling of the trees.

As previously mentioned, the shearing knife head can exert a force upon the branches of a tree ranging from pure impact to a combination of impact, cleavage and cutting. The chain portion of the delimbing and top shear mechanism 114 can therefore comprise links of varying structure. One form is shown in FIGURE 13 and comprises a link plate 198 having ears 200 in alternate position with ears 202. The link plates can thus be hinged consecutively together. At the upper portion of the link plate 198 is an upwardly directed knife edge 204. A beveled surface 206 assists the chain constructed from such link plates to glide over the surface of the tree trunk and avoid gouging the wood. It is also within the contemplation thereof to provide a similar bottom edge 208 which may also be provided with a beveled face 210 as shown.

Although it is not desired to limit the invention to any particular theory, it is believed that a unique cooperation is achieved among the knife head 114, the elongated cable 116, and the various actuating and/or drive mechanism elements hereinbefore described (and particularly the speed multiplying elements of the drive mechanism). If a conventional slow speed, high power drive mechanism were used with the instant knife head 114 and elongated cable 116 to move the knife head slowly up the tree, the knife head could develop only a nominal amount of kinetic energy between branches and it would have substantially no kinetic energy, at least momentarily, at the very instant at which the knife edge came in contact with a new branch and the cable started to take up any slack and to undergo a maximum tensile stress for pulling the knife edge through the branch. Under conditions of no stress, the cable 116 has an unstretched (first) length; under solely the load of the weight of the knife head, it must have a (second) slightly greater length; and during slow movement of the knife head against a branch in an effort to drag it slowly through a branch, the cable 116 must be stretched to a maximum (third) length which involves the application of maximum tensile stress to the cable, as the power means attempted to drag the knife head through the branch. Assuming that it would be possible to generate sufficient force to drag the knife edge through the branch in such an arrangement, the cable would thus go through a cycle of maximum tensile stress and elongation (as it pulls the knife through a branch) followed quickly by a minimum or no tensile stress when the knife clears the branch and the "stored" energy in the cable is momentarily relaxed. Under such circumstances, of course, the kinetic energy which the drive means attempts to impart to the knife head also goes through a cycle of approximately zero at the time the knife head is initially brought into engagement with the branch and the cable is developing its maximum tensile stress. The kinetic energy of the knife head after it has cleared a branch would still be very nominal in using an ordinary slow drive, so that such nominal kinetic energy would have little or no significant effect upon cutting of the next branch encountered by the knife head.

In the practice of the instant invention, however, the actuating or drive mechanism employed imparts and maintains kinetic energy substantially continuously during the movement of the knife head up the tree, in the preferred operation of the device. The kinetic energy of the knife head thus assists materially in cutting successive branches engaged by the knife head as it is moved up the tree. The tensile stress on the cable 116 pulling the knife head up the tree is thus comparatively constant, rather than going through the extreme in the cycle involved with a slow speed power device. It will be appreciated that as the rapidly moving knife head shears a branch, the kinetic energy thereof carries out an important, substantial part of the shearing, via impact, but the cable 116 also assists in imparting continuous kinetic energy to the knife head so the cable 116 will doubtlessly undergo some increase in tension as the knife head passes through a branch and at least a nominal reduction in tension as the knife head passes between branches. Since, however, there is a definite frictional drag involved in pulling the knife head up a tree (even between branches), and the distance between branches is often very nominal, the overall changes in tension in the cable during the rapid movement of the knife head up the tree are not substantial. The cable is substantially continuously under tension. The cable is thus believed to be substantially continuously in a slightly elongated condition (within the elastic limits of the metal and in view of the continuous tension stress thereon). It is believed, however, that the tensile stress and/or elongation of the cable during the continuous movement of the knife head up the tree is continuously more than the tensile stress required merely to carry the weight of the knife head (and its resistance to movement) but continuously less than the maximum tensile stress that would be imparted to this cable, if the knife head were moved so slowly that its kinetic energy contributed substantially nothing to the cutting or shearing of the branches and the cable was required to impart all of the shearing force to the knife edge.

In the present operation the drive mechanism maintains the knife head at a sufficient level of kinetic energy to drive it through the branches, primarily in an impact shearing or cleaving process, or at least such that the combination of the kinetic energy of the knife head with the lifting forces continuously applied thereto by the cable provides the required overall impact shearing force to shear the branches. The power means should preferably be capable of applying force substantially independent of the speed of operation so that as the resistance force changes, time is not required for the power means to in effect catch up, but is capable of continuously imparting energy.

It will, of course, be understood that various changes may be made in the form, details, arrangements and proportions of the parts without departing from the scope of our invention as set forth in the appended claims.

What is claimed is:

1. A mechanism for swiftly shearing branches from a standing tree, which comprises a shearing head having means thereon for shearing branches solely in an axial direction along the tree, an elongated element connected to said shearing head for moving the head upwardly along a tree trunk in said axial direction, and drive means operatively connected to said elongated element imparting kinetic energy to the shearing head substantially continuously during its upward movement along the tree trunk, whereby the branches of the tree are sheared off by impact solely in said axial direction.

2. A mechanism for rapidly shearing branches from a standing tree, which comprises a shearing knife head having upwardly directed knife edge means, an elongated element connected to said knife head for moving the head upward along a tree trunk, said element having a flexible operating portion of limited elasticity that has a first length in unstressed condition, a second length greater than the first when loaded solely by the knife head resistance to upward motion and a third length greater than the second when moving the knife edge means through a branch on the tree while the knife head has negligible kinetic energy, and drive means operatively connected to said element maintaining the length of said portion continuously between the second and third lengths as the knife head is moved upwardly shearing the branches from the tree by impact cleavage.

3. A mechanism for rapidly shearing branches from a standing tree, which comprises a shearing knife head having upwardly directed knife edge means, an elongated element connected to said knife head for moving the head upward along a tree trunk, said element having a flexible operating portion of limited elasticity that has a first length in unstressed condition, a second length greater than the first when loaded solely by the knife head resistance to upward motion and a third length greater than the second when moving the knife edge means through a branch on the tree while the knife head has negligible kinetic energy, and drive means operatively connected to said element imparting kinetic energy to the knife head substantially continuously during its movement upward along the tree trunk, said drive means maintaining the length of said portion continuously between the second and third lengths as the knife head is moved upwardly shearing the branches from the tree by impact cleavage.

4. A mechanism for rapidly shearing branches from a standing tree, which comprises a shearing knife head having upwardly directed knife edge means, an elongated element connected to said knife head for moving the head upward along a tree trunk, and drive means operatively connected to said element imparting kinetic energy to the knife head substantially continuously during its movement upward along the tree trunk, said drive means maintaining a level of kinetic energy in the knife head during its entire upward movement along the tree trunk that is substantially in excess of that required to shear branches from the tree trunk, whereby the branches of the tree are sheared off by impact cleavage.

5. A mechanism for rapidly shearing branches from a standing tree comprising, a shearing knife head having an upwardly directed branch shearing edge, a cable connected to said knife head for applying a vertically upwardly directed constant combined shearing force and elevating force to the head, a speed multiplying means connected to the cable, and power drive means connected to the speed multiplying means applying a substantially constant force to the cable independent of the speed of linear movement of the cable so that a substantially constant accelerating force will be applied to the knife head and the head will retain its cutting potential for a subsequent branch while passing each branch on the tree.

6. A mechanism for rapidly shearing branches from a standing tree comprising, a shearing knife head having upwardly directed knife edges, a cable connected to said knife head for applying a vertically upwardly directed constant combined shearing force and elevating force to the head, and a power drive means connected to the cable applying a takeup force thereto maintaining the cable at a tension in excess of a minimum positive tension at all positions of the knife head during movement of the knife head up the tree to effect removal of branches by impact cleavage.

7. A mechanism for rapidly shearing branches from a standing tree comprising, a shearing knife head having upwardly directed knife edges, a cable having an unstressed length, said cable being connected to said knife head for applying a vertically upwardly directed constant combined shearing force and elevating force to the head, and a power drive means connected to the cable applying a takeup force thereto for moving the knife head up the tree, said cable having a length greater than its unstressed length at all times during operation of said drive means and movement of the knife head up the tree, whereby branches are removed by impact cleavage.

8. A mechanism for rapidly shearing branches from a standing tree comprising, a shearing knife head having upwardly directed knife edges, a cable connected to said knife head for applying a vertically upwardly directed constant combined shearing force and elevating force to the head, and a power drive means connected to the cable applying a takeup force thereto always in excess of the gravity pull of the knife head on the cable at all times during upward cutting movement of the knife head to effect removal of branches from the tree by impact cleavage.

9. A mechanism for rapidly shearing branches from a standing tree comprising, a shearing knife head having upwardly directed branch shearing edges, a cable having one end secured to the knife head for applying a vertically upwardly directed constant combined shearing force and elevating force to the head and the other end being anchored to a speed multiplying means, and a force applying means connected to the speed multiplying means applying a substantially constant force to the power multiplying means, said force applying means accommodating changes in speed of movement of the knife head with engagement of branches and release after passing the branches and maintaining a substantially constant force on the cable.

10. A mechanism for rapidly shearing branches from a standing tree comprising, a shearing knife head having an upwardly directed knife edge for cleaving branches along a tree trunk, a power transfer means connected to said knife head, a drive connected to the transfer means for driving the head upwardly along said tree trunk, said power transfer means being elastic and yielding with engagement of a branch by the cutting head a distance proportional to the resistance of individual branches to cutting so that upon release of the head after passing a branch energy stored in said transfer means will tend to accelerate the head at an increased speed tending to release substantially all of the energy stored in said transfer means, said drive accelerating at a rate for maintaining a minimum predetermined force on said transfer means with release of said means as the knife head clears a branch preventing complete release of energy and consequent relaxation of the power transfer means.

11. A mechanism for rapidly shearing branches from a standing tree comprising, a shearing knife head having an upwardly directed branch shearing edge, a cable connected to said knife head for applying a vertically upwardly directed constant combined shearing force and elevating force to the head, a speed multiplying means including a pair of relatively separable spaced sheave members with said cable looped thereover to form a speed multiplier with the end of the cable leading to the head moving at a linear speed faster than the speed of separation of the sheaves, and a hydraulically operated piston and cylinder connected to the multiplying means and applying a substantially constant force for separating the sheaves independent of the linear speed of cable travel.

12. A mechanism for swiftly shearing branches from a standing tree, which comprises a shearing head having upwardly directed branch shearing edge means and downwardly directed branch shearing edge means, an elongated element connected to said shearing head for moving the head upwardly along a tree trunk, and drive means operatively connected to said elongated element imparting kinetic energy to the shearing head substantially continuously during its upward movement along the tree trunk and permitting the shearing head to drop swiftly downward, whereby the branches of the tree are sheared off by impact during said upward movement and such branch stubs as may remain after the upward shearing are completely sheared by impact in the downward movement thereof.

13. A mechanism for swiftly shearing the branches from a tree trunk, which comprises a shearing head having a leading edge and a trailing edge in close proximity to said trunk, and drive means for advancing said shearing head swiftly in one direction to at least shear by said leading edge all of the branches at a position close to said trunk and then to advance said shearing head swiftly in the other direction to shear off by impact with said trailing edge any remaining branch stubs.

14. Apparatus for swiftly shearing branches and topping a standing tree, which comprises a shearing mechanism having a shearing head and a topping blade positioned above said shearing head, an elongated element connected to said shearing mechanism for moving the same upwardly along a tree trunk, drive means operatively connected to said elongated element imparting kinetic energy to the shearing head substantially continuously during its upward movement along the tree trunk to shear the branches therefrom by impact, and an actuator for moving said topping blade across said tree trunk and horizontally above said shearing head to cut off the top of said trunk, said shearing head remaining in engagement with the topped trunk to provide continuous support therefor.

15. Apparatus for swiftly shearing branches from a standing tree and severing the same, which comprises a vertical boom means, a shearing head having upwardly directed branch shearing edge means mounted for movement along said vertical boom means, drive means for moving said shearing head at high speed along the trunk of said standing tree to shear off by impact the branches of said tree, and bottom shear means fixed to the lower end of said vertical boom means and adapted to bear firmly against the ground surrounding said standing tree, and power means for actuating said bottom shear means to sever said tree at the base thereof.

16. The apparatus of claim 15 wherein the bottom shear means has upwardly and outwardly angulated blade means and an inward abutment whereby the bottom of a severed tree will rest upon said angulated blade means and will tend to bear against said abutment after severing of said tree.

17. Apparatus for swiftly shearing branches from a standing tree, severing the same from the ground and placing the severed tree in a predetermined position, which comprises a shearing head having upwardly directed branch shearing edge means, drive means for moving the head upwardly along a tree trunk in close proximity thereto for shearing off the branches of said tree by impact, bottom shear means beneath said shearing head and adapted to sever said standing tree from the ground, said bottom shear means and said shearing head being adapted to be held in spaced relation and supporting said tree after removal of said branches and severing of said tree, and articulated boom means connected to said shearing head and said bottom shear means for controlling the same and placing a cut and delimbed tree at a predetermined location.

18. The apparatus of claim 15 and articulated boom means secured to said vertical boom means and permitting rocking movement with respect thereto.

19. Apparatus for delimbing and felling trees which comprises, a vehicle having a swing platform rotatable about a vertical axis, vertical boom means carried by said swing platform, and shearing means movable along said vertical boom means for shearing off the branches of a tree by impact, a bottom shear mechanism mounted at a low position on said vertical boom means for severing the trunk of said tree at the base thereof, and a power actuator for swinging said platform with respect to the vehicle.

20. The apparatus set forth in claim 19 wherein said power actuator has a sprocket affixed to said vehicle on said vertical axis, a pair of extensible and retractable hydraulic members respectively secured at one end thereof to the swing platform and at the other end thereof to the respective ends of a chain trained about said sprocket.

21. A mechanism for swiftly shearing branches from a standing tree trunk, which comprises a shearing head, and drive means operatively connected to said shearing head imparting sufficient kinetic energy to said shearing head to propel it with sufficient force to cleave by impact at least two branches from said tree trunk.

22. A tree delimbing means embracing a tree and adapted for relative movement along said tree comprising a blade means mounted on said delimbing means and adjacent said tree with said blade means disposed in substantially parallel relationship to said tree; and drive means for propelling said delimbing means along said tree with sufficient force so that said blade means cleaves protruding branches from said tree.

23. The structure of claim 22 wherein said drive means is adapted to propel said delimbing means in reciprocal relative movement along said tree with sufficient force to cleave protruding branches from said tree in the first direction of said movement and to cleave remaining stub portions of said branches on the opposite direction of said movement.

24. The structure of claim 22 including cutting means mounted on said delimbing means and adapted to top said tree when said delimbing means is positioned at a predetermined point on a tree worked in its movement therewith; and arresting means operatively connected to said delimbing means to retain it on said tree after topping thereof.

25. The structure of claim 24 including a second cutting means operatively connected to said delimbing means and adapted to cut said tree at the bottom thereof after delimbing of said tree, said second cutting means being adapted to retain the cut tree thereon in supporting relationship therewith; vertical support means mounting said delimbing means and said second cutting means; and controlled pivot means mounted to said support means for relative angular movement thereof between the vertical and the horizontal.

26. The structure of claim 25 including an articulated boom means operatively connected to said pivot means and adapted to move said support, both, vertically and horizontally; actuating means for said articulated boom to move it to a preselected position spaced from the point of delimbing and bottom cutting; and release means operatively connected to said structure for depositing the bottom cut tree at said preselected position.

27. Apparatus for delimbing and felling trees, which comprises a vehicle, elongated track means carried by said vehicle and positionable into a generally parallel relationship with a standing tree, said track means including a pair of relatively longitudinally reciprocable beams providing extensibility, means movable along said track means for delimbing said standing tree, means on said track means for topping said tree after said delimbing action has taken place, means for severing said tree near the base thereof fixedly mounted at one end of one of said beams, said one beam having a sheave at its other end, a flexible cable attached to the second of said beams at one end thereof and passing over said sheave for raising said second beam relative to said one beam, and a reach boom assembly supported at one end of said vehicle and supporting said one beam at the other.

28. The apparatus set forth in claim 27 in which said one beam is pivotally supported on said boom assembly, and means for tilting said one beam relative to said boom assembly being included in said boom assembly.

29. The apparatus set forth in claim 28 in which said vehicle includes a swing platform rotatable about a vertical axis, said boom assembly being mounted on said platform.

30. Apparatus for delimbing and felling trees comprising a vehicle, an articulated reach boom assembly on said vehicle including a plurality of pivotally connected boom members, a sliding boom assembly mounted on the free end of said reach boom assembly, said sliding boom assembly including first and second elongated boom members and said second boom member being extensible relative said first boom member, a combined delimbing and top shear mechanism movable in unison and guided by said sliding boom assembly, means disposed on said second boom member for guiding said combined delimbing and top shear mechanism longitudinally therealong, a first cable connected at one end to said second boom member and guided by said first boom member for extending said second boom member, a second cable connected at one end to said first boom member and at its other end to said combined delimbing and top shear mechanism for raising said delimbing and top shear mechanism as said second boom member is extended, and a top shear mechanism affixed to the lower end of said sliding boom assembly.

31. Apparatus for delimbing and felling trees comprising a vehicle, elongated track means carried by said vehicle and positionable into a generally parallel relationship with a standing tree, a U-shaped frame means movable along said track means, an arcuate arm pivotally supported on said frame means and movable into a position to close the bight of said frame means, a flexible chain attached at one end to the free end of said arm, means attaching the other end of said chain to said frame means including a spool and spring means normally biasing said spool in a direction to take up said chain, whereby when said arm is swung into a position to close the bight of said frame means said chain will substantially encircle said standing tree when embraced by said frame means, and means on said track means for severing said standing tree near the base thereof.

32. A delimbing mechanism comprising frame means having a U-shaped opening for accommodating a portion of a standing tree therein, a flexible chain carried by said frame means and deflectable into a partially encircling relationship with said tree in the confines of said opening, means including a pivotal arcuate arm on said frame means for actuating said chain into substantially a complete encirclement of said tree after said partially encircling relationship is achieved, one end of said chain being connected to the free end of said arm, and means yieldably connecting the other end of said chain to said frame means which includes a spring biased take-up spool.

33. Apparatus for delimbing and felling trees comprising a vehicle, elongated track means carried by said vehicle and positionable into a generally parallel relationship with a standing tree, frame means movable along said track means, a flexible chain, means on said frame means for holding said chain in an encircling relation with the tree and in a substantially fixed condition relative to said frame means, means on said track means for topping said tree after said delimbing action has taken place, means on said track means for severing said standing tree near the base thereof, power means mounted on said vehicle, and flexible cable means interconnecting said power means and said frame means for actuating said frame means swiftly along said track means to effect impact shearing of branches from a standing tree.

34. The apparatus set forth in claim 33 in which said track means includes a pair of relatively longitudinally reciprocable beams providing extensibility.

35. Apparatus for delimbing and felling trees comprising a vehicle, an articulated reach boom assembly on said vehicle including a plurality of pivotally connected boom members, a sliding boom assembly mounted on the free end of said reach boom assembly, a combined delimbing and top shear mechanism movable in unison and guided by said sliding boom assembly, said mechanism including a relatively fixed, flexible cleavage means thereon, and a bottom shear mechanism affixed to the lower end of said sliding boom assembly.

36. The apparatus set forth in claim 35 in which said sliding boom assembly includes first and second elongated boom members with said second boom member being extensible relative said first boom member, and including means disposed on said second boom member for guiding said combined delimbing and top shear mechanism longitudinally therealong.

37. Apparatus for delimbing and felling trees comprising a vehicle, elongated track means carried by said vehicle and positionable into a generally parallel relationship with a standing tree, a U-shaped frame means movable along said track means, an arcuate arm pivotally mounted on said frame means and movable into a position to close the bight of said frame means, a flexible chain attached at one end to the free end of said arm, means attaching the other end of said chain to said frame means, whereby when said arm is swung into a position to close the bight of said frame means said chain will substantially encircle said standing tree when embraced by said frame means, and means on said track means for severing said standing tree near the base thereof.

38. The apparatus set forth in claim 37 including a top shear blade mounted on the upper side of said frame means.

39. The apparatus set forth in claim 38 including a shaft pivotally mounting said top shear blade, said shaft extending downwardly to a locus at the under side of said frame means, and means disposed on the under side of said frame means for pivoting said shaft to cause said top shear blade to perform a cutting operation.

40. The apparatus set forth in claim 37 in which said means for severing said tree near the base thereof includes a pair of cooperable pivotal blades.

41. Apparatus for delimbing and felling trees comprising a vehicle, elongated track means carried by said vehicle and positionable into a generally parallel relationship with a standing tree, a bracket movable along said elongated track means, a U-shaped frame pivotally mounted on said bracket, an arcuate arm pivotally mounted on said frame and movable into a position to close the bight of said frame, a flexible chain attached at one end to the free end of said arm, means attaching the other end of said chain to said frame, whereby when said arm is swung into a position to close the bight of said frame means said chain will substantially encircle said standing tree when embraced by said frame means.

42. A delimbing mechanism comprising frame means having a U-shaped opening for accommodating a portion of a standing tree therein, a flexible chain carried by said frame means and deflectable into a partially encircling relationship with said tree in the confines of said opening, and means including a pivotal arcuate arm on said frame means for actuating said chain into substantially a complete encirclement of said tree after said partially encircling relationship is achieved, one end of said chain being connected to the free end of said arm.

43. The mechanism set forth in claim 42 in which said last-mentioned means includes means yieldably connecting the other end of said chain to said frame means.

44. Apparatus for delimbing and felling trees comprising a vehicle, elongated track means including a pair of relatively longitudinally reciprocable beams providing extensibility, said track means being carried by said vehicle and positionable into a generally parallel relationship with a standing tree, means movable along one of said beams for delimbing said standing tree, means on said one beam for topping said tree after said delimbing action has taken place, means fixedly mounted at one end of the other of said beams for severing said standing tree near the base thereof, said other beam having a sheave at its other end, power means mounted on said vehicle, and flexible cable means interconnecting said power means and said delimbing means for actuating said delimbing means swiftly along said track means, said flexible cable means being attached to the said one beam at one end thereof and passing over said sheave for raising said one beam relative to said second beam.

References Cited by the Examiner
UNITED STATES PATENTS

| | | | |
|---|---|---|---|
| 1,313,709 | 8/1919 | McKoy et al. | 144—309 |
| 2,700,404 | 1/1955 | Birnie | 144—309 |
| 2,777,483 | 1/1957 | Cherem | 143—43 |
| 2,876,816 | 3/1959 | Busch et al. | 144—34 X |
| 2,948,311 | 8/1960 | McCollum | 144—2 X |
| 3,074,446 | 1/1963 | Earl | 144—3 |
| 3,102,562 | 9/1963 | Horncastle | 144—3 |

WILLIAM W. DYER, Jr., *Primary Examiner.*

DONALD R. SCHRAN, *Examiner.*

W. D. BRAY, R. J. BIRD, *Assistant Examiners.*